Figure 19:
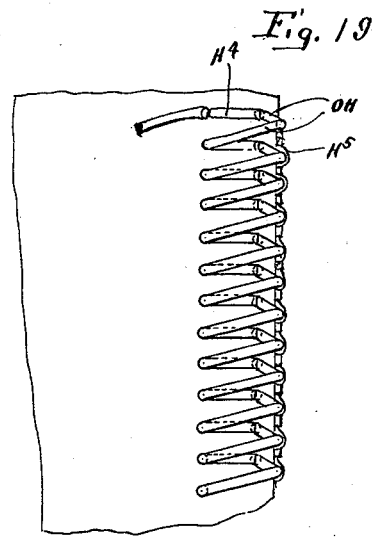

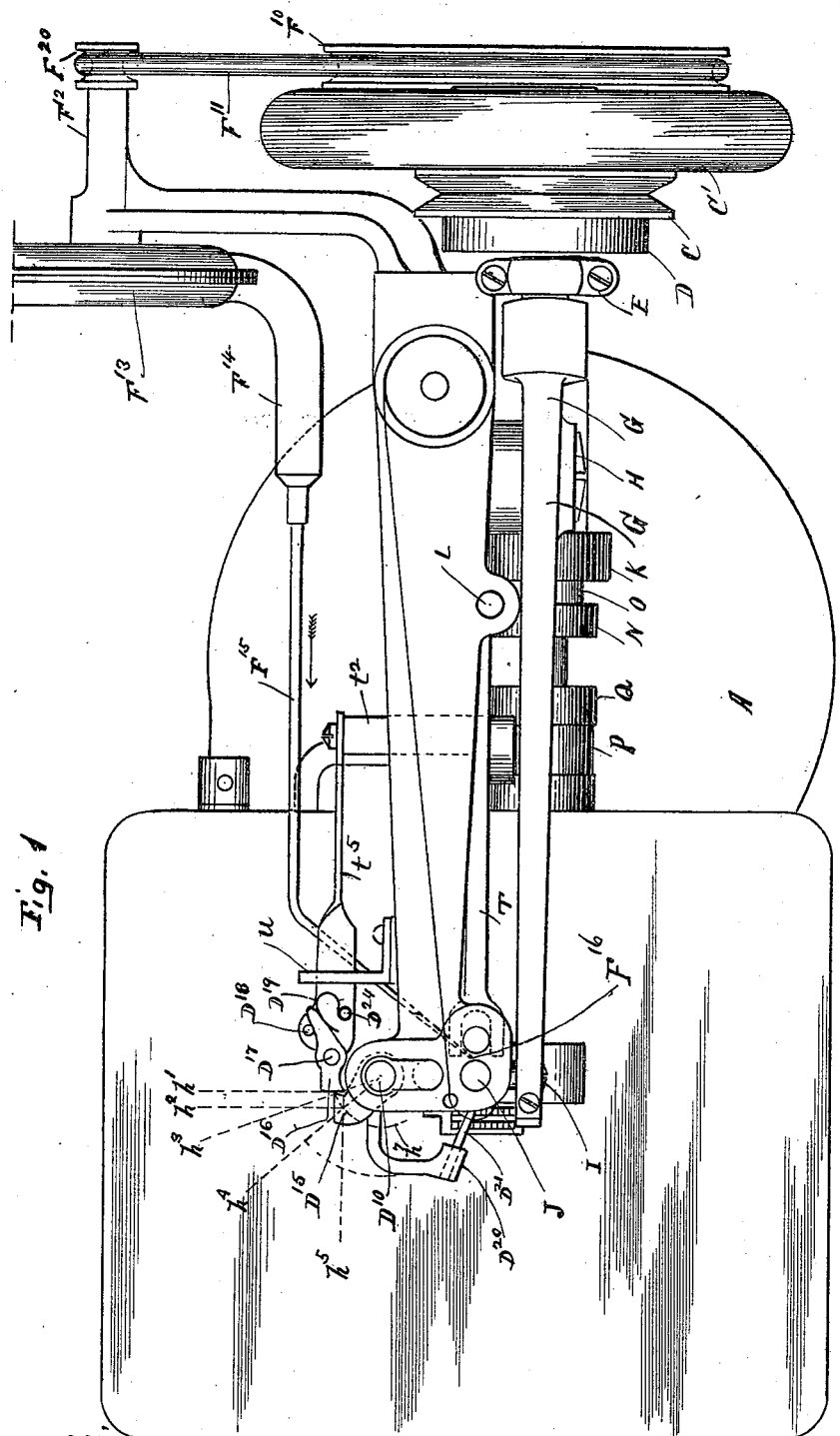

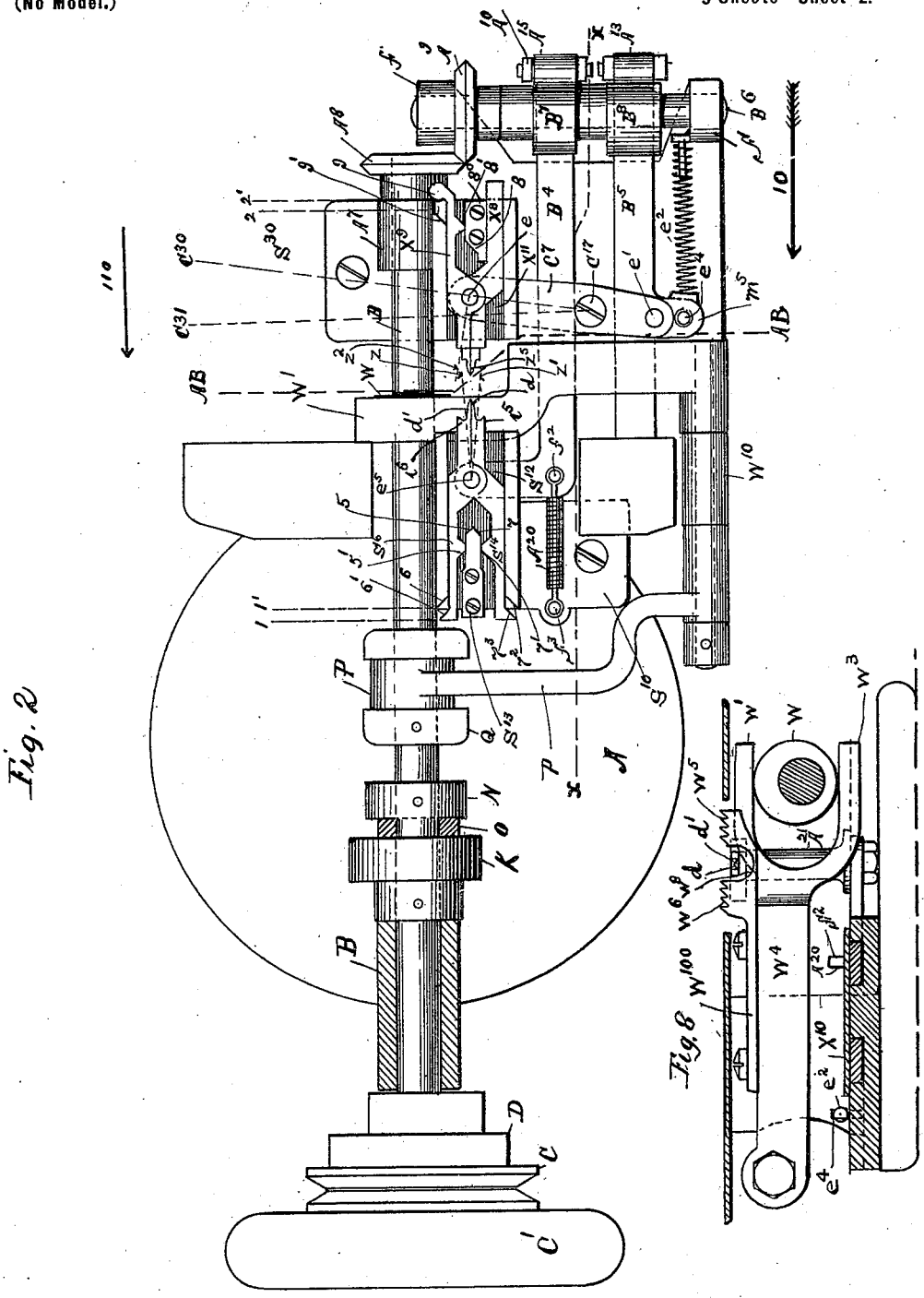

No. 683,901. Patented Oct. 8, 1901.
H. A. BLANCHARD.
OVERSEAMING SEWING MACHINE.
(Application filed July 27, 1897. Renewed Feb. 28, 1901.)
(No Model.) 9 Sheets—Sheet 3.
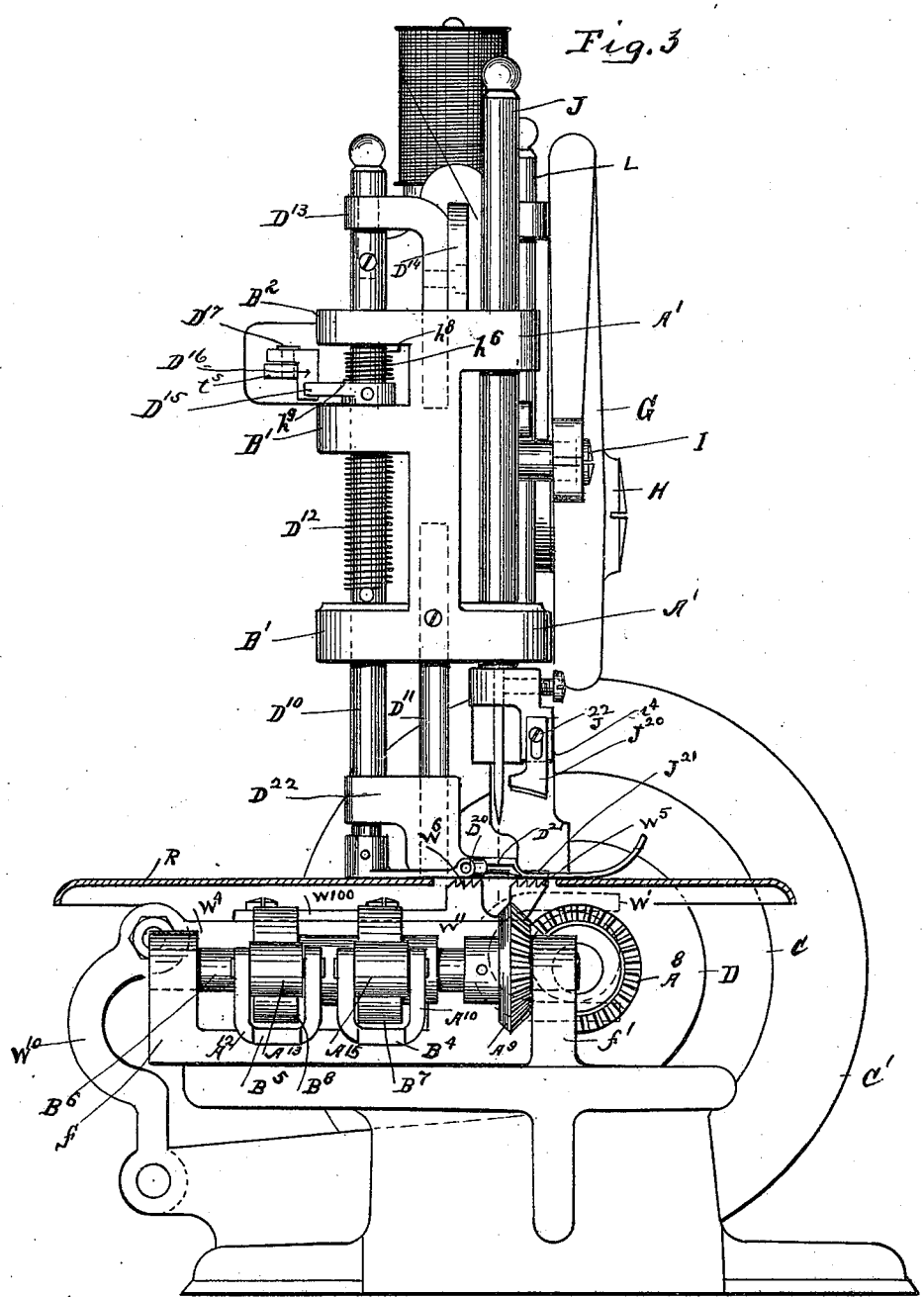

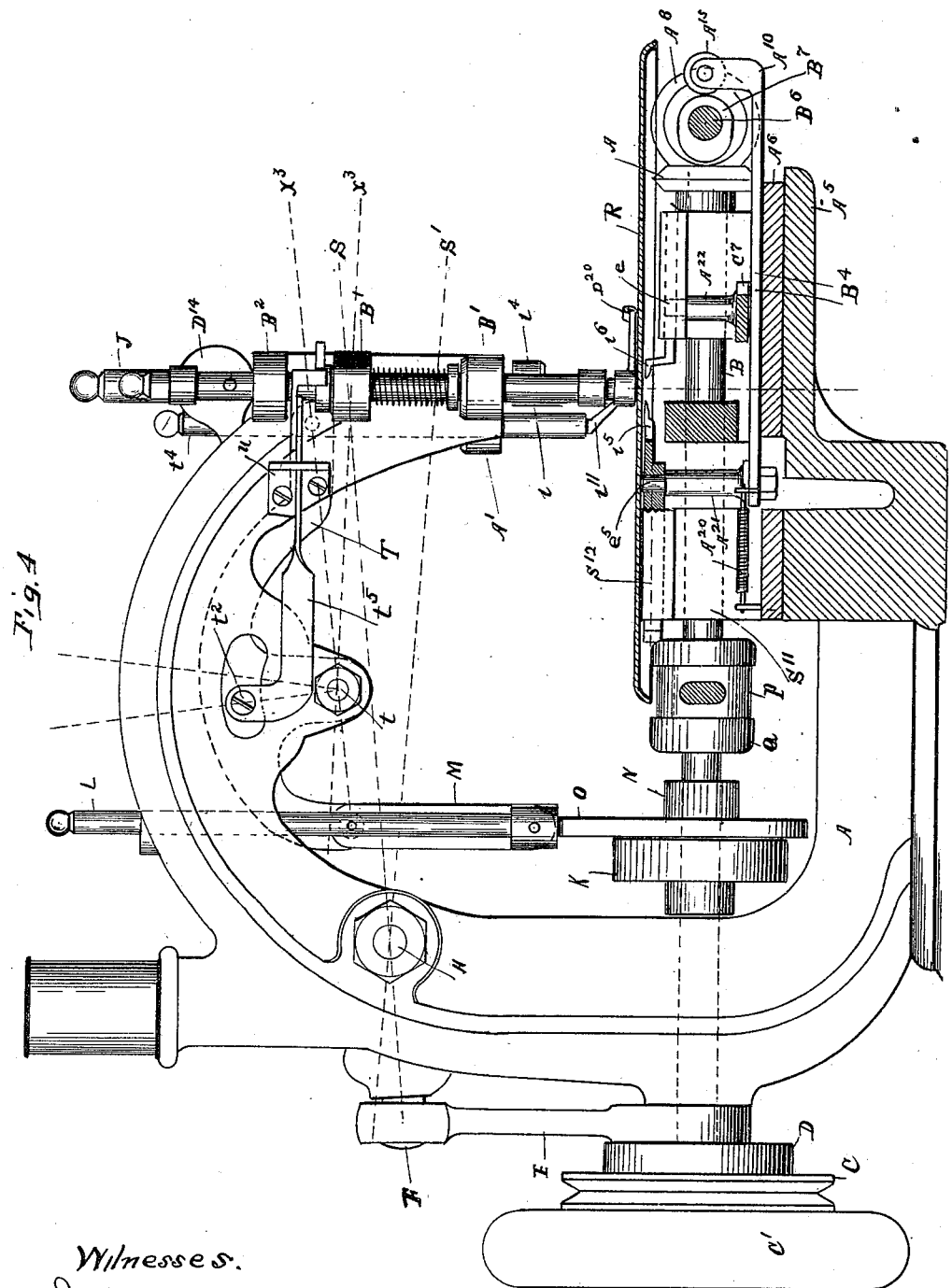

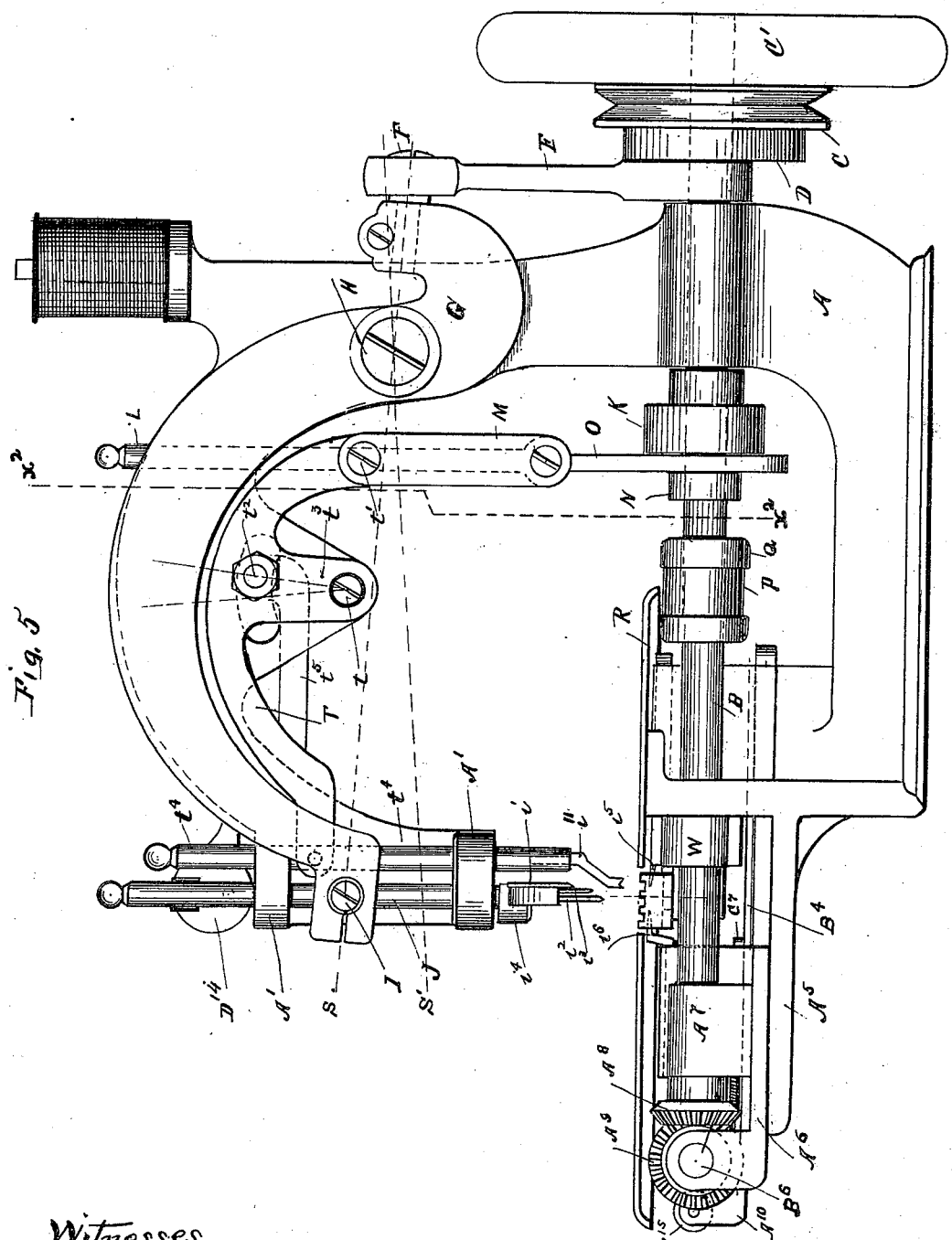

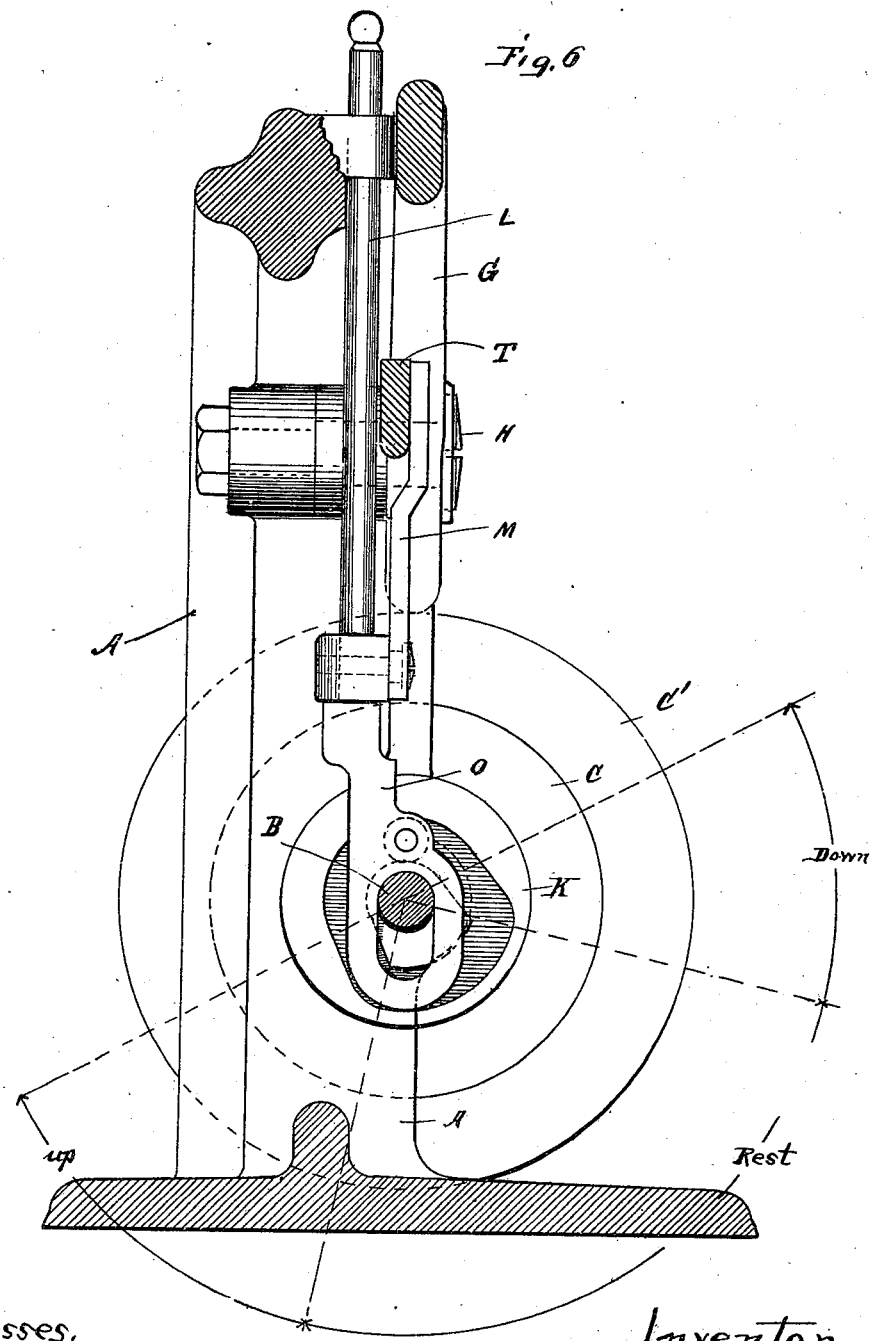

No. 683,901. Patented Oct. 8, 1901.
H. A. BLANCHARD.
OVERSEAMING SEWING MACHINE.
(Application filed July 27, 1897. Renewed Feb. 28, 1901.)
(No Model.) 9 Sheets—Sheet 7.
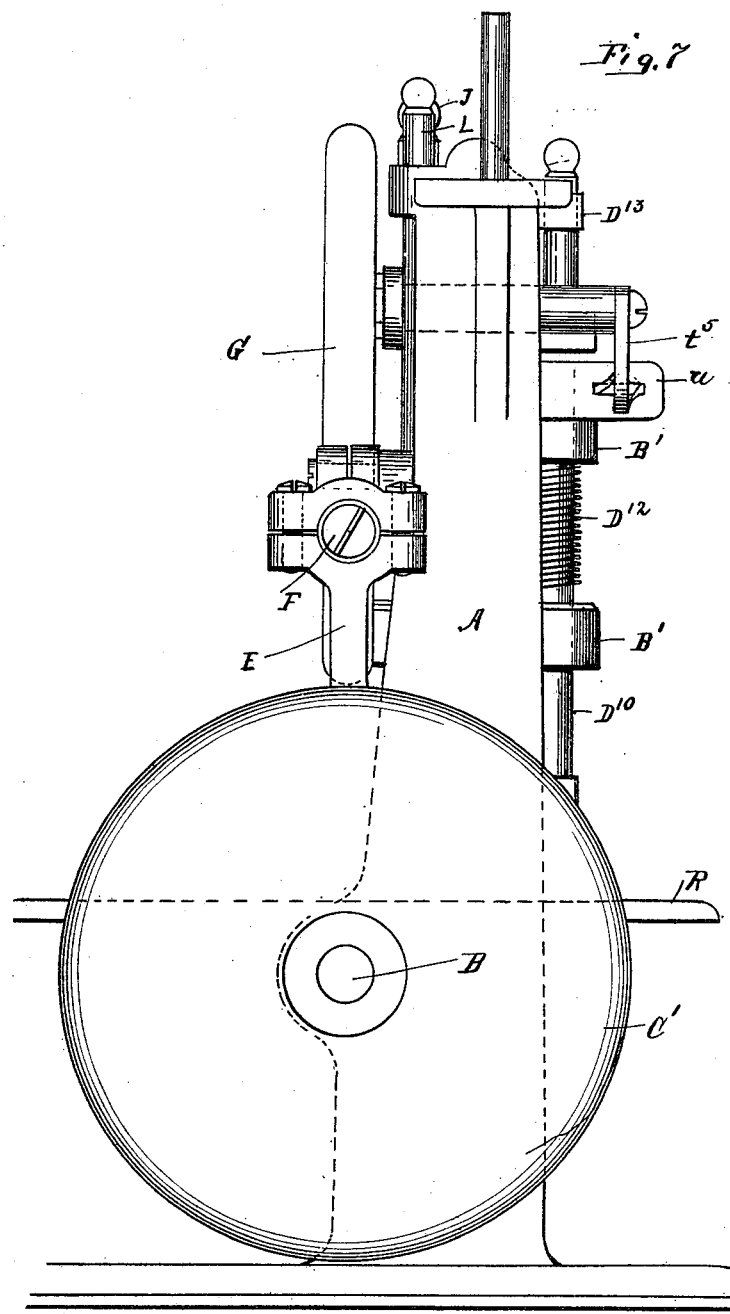

No. 683,901. Patented Oct. 8, 1901.
H. A. BLANCHARD.
OVERSEAMING SEWING MACHINE.
(Application filed July 27, 1897. Renewed Feb. 28, 1901.)
(No Model.) 9 Sheets—Sheet 8.
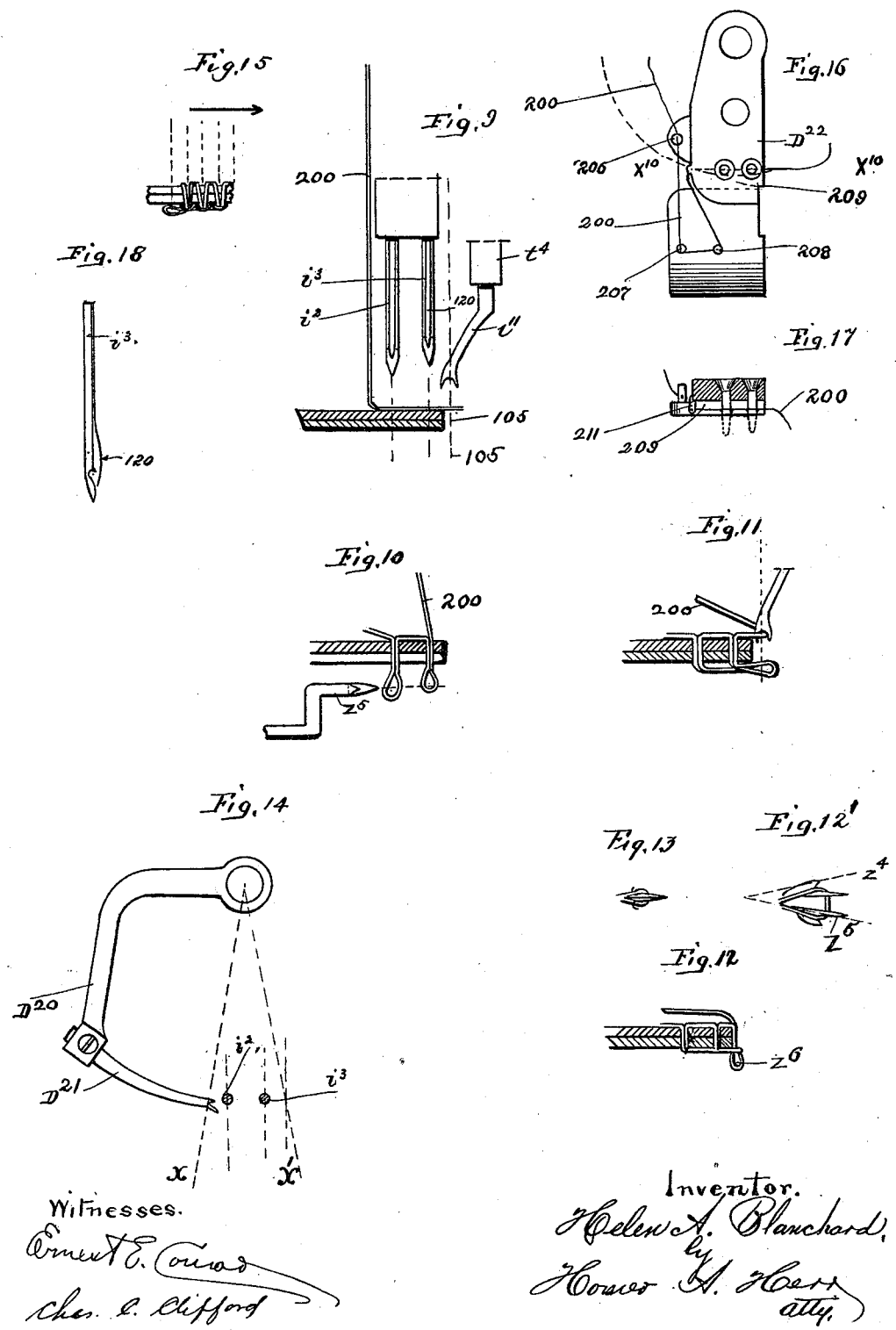

No. 683,901. Patented Oct. 8, 1901.
H. A. BLANCHARD.
OVERSEAMING SEWING MACHINE.
(Application filed July 27, 1897. Renewed Feb. 28, 1901.)

(No Model.) 9 Sheets—Sheet 9.

Witnesses
Inventor.
Helen A. Blanchard
by Homer A. Herr
atty.

UNITED STATES PATENT OFFICE.

HELEN A. BLANCHARD, OF PORTLAND, MAINE.

OVERSEAMING SEWING-MACHINE.

SPECIFICATION forming part of Letters Patent No. 683,901, dated October 8, 1901.

Application filed July 27, 1897. Renewed February 28, 1901. Serial No. 49,298. (No model.)

*To all whom it may concern:*

Be it known that I, HELEN A. BLANCHARD, a resident of Portland, county of Cumberland, State of Maine, have invented a new and useful Improvement in Overedging Sewing-Machines, of which the following is a specification.

My invention has reference to sewing-machines; and it consists of features fully set forth in the following specification and accompanying drawings, forming part thereof. It belongs more particularly to sewing-machines of the overedging type, or rather machines which, while uniting the fabric, overseam and cover the edges of the two united fabric ends. It not only unites and covers the fabric edges, but it unites them flexibly, and is designed for use particularly in knitted goods, such as underwear, &c.

The object of my invention is expressed in the name above given—that is, fabric uniting and overedging sewing-machine.

My invention consists of the parts and the constructions, arrangements, and combinations of parts hereinafter described and claimed.

In the drawings like parts are referred to by marks or figures of a corresponding kind in the different views.

Figure 20:
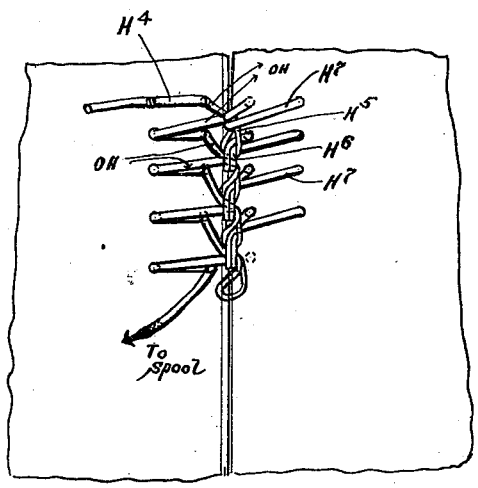

Figure 1 is a general plan of the machine. Fig. 2 is a plan of the primary and secondary thread-expander in their normal positions, together with the mechanism which actuates them. Fig. 3 is a front end view of the machine. Fig. 4 is a left side elevation of the machine looking from the front and a section on line $x\,x$ of Fig. 2. Fig. 5 is a right side elevation of the machine looking from the front with parts removed. Fig. 6 is a vertical section on line $x^2\,x^2$ of Fig. 5. Fig. 7 is the rear end elevation. Fig. 8 is a section on the line A B A B, Fig. 2, looking in the direction of the arrow 10. Fig. 9 shows the position of needles and depressor normally in their relation to each other. Fig. 10 shows the position of the two loops after the needles have carried the same through the fabric and in position to be engaged by the primary thread-expander. Fig. 11 shows the position of these same two loops after being carried underneath the fabric by the primary thread-expander to a position in vertical alinement with the thread-depressor, and it also shows the thread-depressor as having engaged the over-fabric spool end of the thread. Fig. 12 shows the overedging loop as carried by the depressor down and through the under-fabric loops. Fig. 13 shows one of the thread-expanders as having taken a loop and prior to expanding it. Fig. 12' shows one of the thread-expanders as having taken a loop and expanded it. Fig. 14 is a plan of the over-fabric-thread carrier, whereby the spool end of the thread is carried in alinement with the needle-depressor. Fig. 15 is an end view of the overedging thread. Fig. 16 is a plan of my presser-foot threaded. Fig. 17 is a transverse section on line $x^{10}\,x^{10}$ of Fig. 16. Fig. 18 is a side elevation of my needle, showing the elastic finger at 120. Fig. 19 is a plan of my stitch with the sides of the fabric in lateral contact. Fig. 20 is a plan with the fabric unfolded endwise. These views are greatly enlarged.

A is the standard of the machine of the well-known gooseneck pattern.

B is the main or primary driving-shaft, carrying the usual belt-wheel C and balance-wheel C'.

D is the needle-bar-actuating cam.

G is the needle-bar carrying and actuating lever, pivotally held to the main standard A by the screw-stud H.

J is the needle-bar, held to its actuating-lever arm by the stud-pin I in the well-known way.

$i^2$ and $i^3$ are the two thread-gripping needles, carried by the bar J through an intermediate supplemental holder $i^4$.

$i''$ is the depressor, carried by the depressor-rod $t^4$. This rod is actuated by and fixed to its actuating-arm T, pivotally supported to the main standard by the stud-pin or screw $t$, Fig. 5.

K is a cam carried by the shaft B, Figs. 2, 5, and 6. This cam actuates the sliding bar O, imparting thereto an intermittent, irregular, and reciprocating motion. (Best explained by the diagram shown in the sectional view, Fig. 6.)

M is a link uniting the aforementioned depressor-actuating arm T to the sliding bar O. Thus the cam K actuates the depressor $i''$ in accordance with the aforementioned diagram. The functional coöperation of this depressor in pursuance of this diagram with the needles and thread-expanders will be explained hereinafter when describing the loop-forming operation.

$t^2$ is a rod or stud carried by the lever T and is designed to actuate the overedging thread-finger support $D^{20}$ and therethrough the finger $D^{21}$, Figs. 1 and 4. The manner of actuating this finger is as follows: The presser-foot $D^{22}$ is carried by the rod $D^{10}$. It is thus apparent that the rod $D^{10}$ can oscillate while the presser-foot remains stationary as to oscillating motion. The presser-foot is held against oscillation by the rigid guide-rod $D''$, Fig. 3, on which rod the said presser-foot is free to slide vertically.

$D^{15}$ is a dog or pawl rigid with the presser-foot rod $D^{10}$, and therefore when the said pawl is oscillated with the rod $D^{10}$ as its pivot the finger-support $D^{20}$ is also oscillated, but the presser-foot remains stationary, as already explained. The arm $t^5$ carries a pawl or dog $D^{16}$, the latter being pivoted thereto by the pin $D^{17}$. The pin $D^{18}$, carried by the said arm, prevents the pawl from oscillating inward, and the spring $D^{19}$ holds the said pawl in normal engagement with the said pin. This mechanism is best explained in Fig. 1. The said spring is fixed to said arm by the pin $D^{24}$. The said spring is of sufficient strength to prevent the pawl from oscillating springward during the forward motion of the arm $t^5$. The movement of the overedging thread-finger $D^{21}$ is of such a character that it trips this pawl $D^{15}$ before the arm $t^5$ has completed its full movement. This is in part due to the fact that the cam K actuates both the depressor $i''$ through the means already described and also the overedging thread-fingers, to which latter end the rod $t^2$, pivoted to the bar $t^5$, is rigidly carried by or fixed to the lever T. Fig. 1 explains this tripping function, where $h'$ shows the normal position of the contact end of the pawl $D^{16}$ with the presser-foot pawl $D^{15}$. Now when the pawl $D^{16}$ moves forward in the rectilinear line $h^5$ from $h'$ to $h^2$ the pawl $D^{15}$ will have oscillated from $h^3$ to $h^4$ at the arc $h^7$. The intersection of the lines $h^2$ and $h^4$ with the dotted arc is the position at which the pawls $D^{16}$ and $D^{15}$ are disengaged. A coil-spring $h^6$, Fig. 3, fixed to the gearing $D^2$ at $h^8$ at one end and to the pawl $D^{15}$ at $h^9$ at the other, immediately on the release of said pawls, returns the presser-foot rod to its normal position. The mechanical or functional coöperation of the overedging thread-finger aforesaid with other elements of the machine during the process of overedging will be explained more at length hereinafter when describing the operation of the machine.

I have now described the mechanism for actuating the needles, the depressor-actuating mechanism, and the means employed for carrying the spool end of the thread from the path of the needles to the line of the depressor or what I technically term the "overedging-thread carrier." I will now proceed to describe the mechanism for taking and spreading the thread-loops formed by the means already described. The plan view shown in Fig. 2 best explains this mechanism.

$B^4$ is a right-angular-shaped rectilinear-moving plate carried in suitable guides by the bed-plate of the machine. At its outer end it has two upwardly-extending arms $A^{10}$ $A^{10}$, Figs. 2, 4, 5, and 10. These arms serve as supports for the pin of a friction-roller $A^{15}$.

$B^7$ is a cam carried by the secondary shaft $B^6$ and actuated by the follower $A^9$ of the gear $A^8$, the latter rigid with and actuated by the primary shaft B.

$A^{20}$ is a spring keeping the friction-roller $A^{15}$ in close engagement with its actuating-cam $B^7$. The pin $f^2$ holds this spring to the plate $B^4$ and the pin $f^3$ holds it to the bed-plate $S^{10}$. This bed-plate $S^{10}$ is, in fact, a supplemental standard and for convenience in manufacture is fixed to or carried by the main standard of the machine. It has an upward-extending portion $S^{11}$, which carries a slotted cap or head $S^{12}$, Figs. 2 and 4. This slotted head carries a cam-plate $S^{13}$. The lateral longitudinal guide-walls of this head, whereby the said slot is formed, are parallel, but at their rear end these walls are outwardly diverging, forming thereby cams 6 and $7^2$. The cam-plate $S^{13}$ also carries beveled edges at its inner end, thereby forming cams 5 and 7.

$S^{14}$ and $S^{16}$, Fig. 2, are two sliding jaws guided in the slot $S^{12}$ by the lateral walls thereof aforementioned.

$d'$ is a needle-pointed supplemental or integral portion of the sliding jaw $S^{16}$, and $d$ is a needle-point of the jaw $S^{14}$ of like description. The making of these needle-points is a matter of care, and when in their normal position, as shown in Fig. 2, the points must be united closely and coincide circumferentially or exteriorly and, in effect, are but a single needle. They carry integral and slightly-concave laterally-projecting lugs or fingers $i^5$ and $i^6$. These lugs are loop-arresters and are designed to engage the thread and prevent it being shed from the thread-expanders while expanding. This is best shown in the detail view, Fig. 12.

$e^5$, Figs. 2 and 4, is a head of reduced diameter of or on the spreader-actuating stud $A^{21}$. The jaws $S^{14}$ and $S^{16}$ are loosely but snugly fitted to this post or stud at said head $e^5$, thus permitting the said jaws to oscillate thereon freely. It will now be evident that when the cam $B^7$ through the roller $A^{15}$ actuates the sliding jaws $S^{14}$ and $S^{16}$ through the bar $B^4$ and stud $A^{21}$, with its head $e^5$, the cam $6'$, carried by the jaw $S^{16}$, and cam $7^3$, carried by the jaw $S^{14}$, will each contact with their respective cams 6 and $7^2$, and on further movement of the bar $B^4$, which the cam $B^7$ is timed to give it, the aforesaid contacting cams will expand the jaws, as shown in Fig. 12 and as indicated by the dotted lines $z$ and $z'$, Fig. 2. After the expanders are expanded and have performed the function of their design in the loop formation it is important they should be returned to their normal position and by a simple and positive means.

$7'$ is a cam carried by the jaw $S^{14}$. $5'$ is a cam carried by the jaw $S^{16}$. Now as these cams move forward in the manner and by the means described the cam $5'$ is forced down past the beveled end 5 of the central part $S^{13}$ and the cam $7'$ is carried down the cam 7. The cams 6 and $6'$ and 5 and $5'$ and the cams $7^2$ and $7^3$ and $7'$ and 7 are so adjusted that there should be no binding during this movement, and in practice it is found to be better to make the jaws between the cams $5'$ and $6'$ and the cams $7'$ and $7^2$ slightly resilient. The cams or jaws should therefore be made of steel and be properly tempered to this end. This will maintain a firm position of the spreaders at all times and in all positions. Now of course it is evident with the jaws forward and the cams in the position described when I force the bar $B^4$ back to normal by the spring $A^{20}$ in the manner previously detailed the cam 5 will close the jaw $S^{16}$ and the cam 7 will close the jaw $S^{14}$. In Fig. 8 I show the position of these secondary spreaders with their needle-points $d$ and $d'$ in their relation to the fabric-feeding plate.

The spreading mechanism I have just described will be understood in this specification as the secondary thread-spreader.

I will now describe the primary thread-spreader.

$B^8$ is a cam, also carried by the secondary shaft $B^6$.

$B^5$ is a rectilinear-moving sliding bar carrying a friction-roller $A^{13}$ at its outer end. Both these sliding bars move in guiding-grooves, as shown in Fig. 8, and have a retaining cover-plate $X^{10}$. (Shown only in this view.)

$e^2$ is a compression-spring fixed between the laterally-extending arm $M^5$ of the bar $B^5$ and the box or bearing $f$. This spring keeps the cam $A^{13}$ in close engagement with the roller $B^8$ and returns the arm $B^5$ to its normal position.

$e'$ is a pin fixed to the bar $B^5$.

$c^7$ is an oscillating arm pivotally held to the bed-plate at $c^{17}$.

$S^{30}$ is a supplemental standard carried by the main standard of the machine, or it might be an integral portion thereof. $X^{11}$ is a groove carried by said supplemental standard. The function of this groove is identical to that already described and shown in connection with the secondary thread-spreaders—i. e., $S^{12}$—and the description of this latter will make clear the function of the former. The specific difference in structural features, however, is that the central cam-piece 8 carries but one cam, and therefore only one of the jaws—i. e., $x^9$—moves. The limit of its movement is indicated by the line $z^2$ while expanding.

$A^{22}$ is a stud carried by the lever $c^7$ and loosely supporting on the stud-journal $e$ the jaws $x^9$ and $x^8$, Fig. 2.

$8'$ is a cam carried by the jaw $x^9$, and 8 is a coacting cam carried by the block $8^0$. When the cam $B^3$ moves the arm $c^7$ from the position indicated by the dotted radial line $c^{30}$ in the direction of the arrow 110, after a predetermined distance is traversed the cam 9 strikes the cam $9'$ and the cam $8'$ simultaneously passes the cam 8 and slides down thereon, thus oscillating the jaw $x^9$ to the dotted radial line $z^2$, before referred to. During this forward motion the primary expander takes the two loops from the previously-descended needles and expands the said loops, as shown in Fig. $12'$, in which they await the descent of the depressor.

In Fig. 8 is shown the manner of mounting my fabric-feed and the longitudinal relation it sustains to the thread-grippers and secondary spreaders $d'\ d$. $W'$ is the upper, and $W^3$ is the lower, arm of the forked feed-carrier $W^4$. The teeth $W^5$ and $W^6$ are separated by a recessed portion of the tooth-carrying plate, (shown at $W^8$,) thus permitting the spreaders to coact with the needles and depressor and at the same time not obstruct the feeding of the fabric between stitches or the transverse reciprocal feeding movement of the arm $W^4$ or the tooth-plate $W^{100}$, which it carries. This cam W imparts the gripping motion to the aforesaid tooth-carrying plate, and the cam Q, Fig. 2, through the arm P and pivoted supporting-arm $W^{10}$, imparts the transverse feeding motion thereto.

In Fig. 1 is shown a mechanism for removing the lint or removed ends from the needles and mechanism. It is only shown in this one view, where $F^{10}$ is a belt-wheel carried by the wheel $C'$. $F^{20}$ is a small belt-wheel actuated thereby. $F^{12}$ is a blower-support and is rigid with the main base or standard of the machine. $F^{13}$ is the blower. This blower is of the well-known Sturtevant rotary type of blower of small dimensions, and detail description of its structure is not deemed necessary. $F^{14}$ is the primary rigid air-conductor, and $F^{15}$ is the flexible air-conductor, leading to the trimming device of the machine. It is hardly necessary to say that as the machine is operated the wheel $F^{10}$, through the belt $F^{11}$, actuates the blower-shaft of the blower $F^{13}$, and the air-currents thus induced are forced through the rigid primary air-conductor $F^{14}$ and thereafter to the tube $F^{15}$ to point of service, as detailed.

In Fig. 3, $J^{20}$ is the trimmer, carried by the needle-bar J through the needle-support $i^4$. A coinciding knife $J^{21}$ (shown only in Fig. 3) is carried by the tooth-plate $W^{100}$. The knife $J^{21}$ is the under-fabric knife, and the knife $J^{20}$ the over-fabric knife. As the needles descend the over-fabric knife shears the projecting end of the fabric before sewing, insuring an even and uniformly-trimmed edge. I of course do not confine myself to the specific means shown for trimming the ends of the fabric. Many equivalent means could be employed to do this work, and I do not limit myself to that shown.

The presser-foot (shown best in Fig. 16) differs from the ordinary type of presser-feet. It is thread-carrying, 206, 207, and 208 being thread guiding or conducting studs or pins.

209, Fig. 17, shows one side of a groove carried on the under or fabric contact side of the presser-foot and indicated by dotted line in Fig. 16. This groove permits of the over-fabric thread-taker $D^{21}$ passing therein in pursuance of its function.

211 is a depending thread guiding and holding pin, insuring the thread being held in the path of the needles.

Having now described the structure of the machine, its operation is as follows during the sewing and overedging function: In Fig. 9 is shown the normal position of the needles $i^3$ and $i^2$ and the depressor. The needle $i^3$, it will be seen, is somewhat shorter than the needle $i^2$. As these needles descend they take the thread 200, which the presser-foot retains in their path. In Fig. 17 the dotted lines show the position this thread takes after needle engagement, and a still further downward movement of the needle carries the thread to the position shown in Fig. 10, in which position the primary thread gripping and expanding thread-taker takes the loops aforementioned from the needles and forces them to the position shown in Fig. 11. The needles $i^2$ and $i^3$ are timed to meanwhile return to their normal position, but remain stationary while and until the primary thread-expander has positively engaged the said loops. The said primary thread-expander after so engaging by the means already described expands the two loops now held to the position shown in Figs. 12' and 11. Meanwhile the over-fabric thread-carrier $D^{21}$ is oscillated in the manner and by the means also already described from the dotted radial line $x$, Fig. 14, its normal position to and past the needles $i^2$ and $i^3$, taking the spool end of the thread in its traverse and carrying it to the $x'$, same figure. This position brings it in alinement with the depressor $i^{11}$, the depressor-line 105 in Fig. 14 corresponding with the line 105, Fig. 9. The position of the thread, as shown in Fig. 11, is the position it occupies just after being gripped by the depressor and after the over-fabric thread-carrier finger $D^{21}$ has shed the thread to the depressor. Fig. 12 shows the next consecutive position wherein the depressor has passed down and through the jaws $z^5$ and $z^4$ of the primary expander, as shown in Fig. 12', and so held until the secondary thread-expander engages in the loop marked $z^6$, Fig. 12, after which the depressor is returned to normal position and the loop is held by the secondary thread-expander during the feeding of the fabric. Then after the fabric is fed to the degree of its pitch of stitch the primary thread-spreader $z^5$ again takes the thread from the two needles $i^2$ and $i^3$, as previously described, carries them through the loop $z^6$, Fig. 12, thus shedding this loop to the under-fabric loops and forming or completing the chaining of the component loops of the stitch. These operations are repeated, of course, with each stitch.

I do not limit myself to the specific structure of expanders shown, but could make many modifications thereof without departing from the spirit of my invention.

In Figs. 20 and 19, $H^4$ is the over-fabric primary loop; O H, the overedging loop carried by finger $D^{21}$; $H^5$, a continuation thereof; $H^6$, the under-fabric loop carried through loop $H^5$, and $H^7$ the thread for loop $H^6$.

I do not confine myself to the specific mechanism shown for the different functions set out, but could make numerous modifications without departing from the spirit of my invention.

Having now described my invention and in what manner it operates, what I desire to secure by Letters Patent is—

1. The combination in a sewing-machine of a presser-foot having a thread-guide, two reciprocating thread-taking needles normally disengaged from the thread and adapted to taking the thread before fabric penetration, and whereby, after fabric penetration, two independent thread-loops are formed, means for carrying the spool end of the thread over and around the edge of the fabric, and means for concatenating the two said loops and the loop which has been brought around the edge of the fabric.

2. The combination in a sewing-machine of a presser-foot having means for holding the thread, two notched needles normally disengaged from the thread and adapted to taking the thread before fabric penetration, and after fabric penetration forming two independent loops, means for operating the needles, means for carrying the spool end of the thread over and around the edge of the fabric, and means for concatenating the two said loops with the overedge loop.

3. The combination in a sewing-machine of a presser-foot having means for holding the thread, two reciprocating thread-taking needles normally disengaged from the thread, means carried by the presser-foot whereby the thread-gripping function is assured, an over-fabric thread-carrier and loop-former, an under-fabric thread-carrier and loop-former, means for carrying the over-fabric formed loop around the edge of the fabric and passing it through the loop formed by the under-fabric loop-forming mechanism, fabric-feeding devices and means for actuating said feeding devices.

4. The combination in a sewing-machine of two reciprocating thread-taking and thread-shedding needles, means for actuating said needles, a presser-foot having means for holding a thread, means for insuring the thread-gripping function, a thread-depressor, a primary thread taking and expanding device adapted to take the loops formed by said two needles after fabric penetration, an over-fabric thread-carrier adapted to deliver the spool end of the thread to said depressor, a secondary thread taking and expanding device, means for actuating said primary and secondary expanders, and means for actuating said depressor, substantially as described for the purpose set forth.

5. The combination in a sewing-machine, of reciprocating thread-taking needles normally disengaged from the thread and adapted to engage said thread and carry it through the fabric, means for operating said needles, a presser-foot having means for holding a thread, means carried by the presser-foot whereby the thread-gripping operation is assured, a thread-carrier for carrying the spool end of the thread over and around the edge of the fabric, means for operating said carrier, and means for concatenating the spool end of the thread with the portions of thread carried by the needles.

6. The combination in a sewing-machine of two reciprocating thread-taking needles normally disengaged from their thread a common needle-carrying bar for said needles, means for actuating said bar a presser-foot, means for holding the thread in the path of the needles whereby their thread-taking function is assured, a thread-depressor, means for carrying the thread from the line of the needles to the vertical path of the depressor, means for engaging the thread after fabric penetration and taking it from the needles and means for concatenating the thread engaged by the depressor with the thread taken from the needles after fabric penetration.

7. The combination in a sewing-machine of two reciprocating needles normally disengaged from the thread, a common supporting-bar therefor, a presser-foot having means for holding the thread in the path of the needles, means for forming loops from the spool end of the thread and means for taking loops from the needle after fabric penetration and concatenating these loops with the spool end of the thread.

8. The combination in a sewing-machine, of two thread-taking needles and a single support-bar therefor, means for operating the needles, a presser-foot having a thread-guide disposing the thread in the path of the needles, a loop-forming device to engage the spool end of the thread and means for operating said device to cause it to coact with the needles during the operation of overedging and sewing, and means for concatenating the spool end of the thread with the portions of thread carried by the needles.

9. An overedging mechanism for a sewing-machine, whereby the overedging and fabric-uniting functions are performed from a single thread, consisting of thread-taking and thread-shedding needles, means coacting with the needles whereby their thread-taking function is insured, means for carrying the spool end of the thread over the edge of the fabric, under-fabric thread taking and carrying devices and means for concatenating the looped portions of the thread.

10. An overedging mechanism for a sewing-machine whereby the overedging and fabric-uniting functions are accomplished from a single thread, consisting of thread-taking and thread-shedding needles, means coacting with the needles whereby their thread-taking function is assured, means for carrying the spool end of the thread over the edge of the fabric, and means for concatenating the looped portions of the thread.

11. In a sewing-machine, the combination with means for holding a thread in the path of needle descent, of needles normally disengaged from the thread and adapted to take said thread before fabric penetration and to form independent loops therein, means for operating said needles, means for carrying a portion of the same thread over the edge of the fabric and means for concatenating the loops and the last-named portion of the thread.

12. In a sewing-machine, the combination of a plurality of needles normally unthreaded and having means for taking the thread, means for operating the needle, means for holding the thread above the fabric and in the path of said needles whereby the needles take the thread before fabric penetration and form loops therein, means for placing the loops together to form a common loop, means for carrying a portion of the thread over the edge of the fabric, and means for concatenating the loops with the last-named portion of thread.

13. In a sewing-machine, the combination of a thread-guide, needles adapted to carry the thread through the fabric and to shed loops after fabric penetration, means for operating the needles, means for placing the loops together and means for concatenating the loops with another portion of the same thread.

In testimony whereof I have hereunto set my hand, this 22d day of June, A. D. 1897, in the presence of two witnesses.

HELEN A. BLANCHARD.

Witnesses:
 HOMER A. HERR,
 JOSHUA R. MORGAN.